June 20, 1961  W. D. JOHNSTON  2,989,075
VALVE
Original Filed May 11, 1953

WILLIAM DERRICK JOHNSTON  Inventor

By
Charles L. Lovercheck
Attorney

2,989,075
VALVE

William Derrick Johnston, 629 Kahkwa Blvd., Erie, Pa.
Continuation of application Ser. No. 354,223, May 11, 1953. This application Jan. 25, 1957, Ser. No. 636,314

5 Claims. (Cl. 137—556.6)

This invention relates to valves and, more particularly, to valves and shut-off means for use in pipe lines and fluid conductors where an extremely high pressure or high vacuum is encountered.

This application is a continuation of patent application, Serial No. 354,223, filed May 11, 1953 now abandoned.

In valves made according to prior designs, the body of the valve was often made by a casting process which was frequently an intricate and expensive process. Furthermore, the movable parts of prior valves were so arranged and designed that they were subject to wear, mechanical difficulties, and failure during operation.

It is, accordingly, an object of this invention to overcome the above and other defects in prior valves and, more particularly, it is an object to provide a valve suitable for use in high pressure fluid and gas lines and pipes as well as in high vacuum services and applications wherein the valve is simple in construction, economical to manufacture, and simple and efficient in use.

Another object of the invention is to provide a novel type of body member and fluid passages therein in a high pressure valve.

A further object of this invention is to provide a novel body member for a valve in combination with a novel sealing means for the plunger of the valve.

A still further object of the invention is to provide a novel construction of gas, fluid, or liquid passage through a high pressure valve.

Yet another object of this invention is to provide an indicating means to indicate to what degree a valve has been opened.

Yet a further object of this invention is to provide a novel means for controlling the force on the packing in a valve.

Still another object of the invention is to provide a novel resilient stop means in a valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
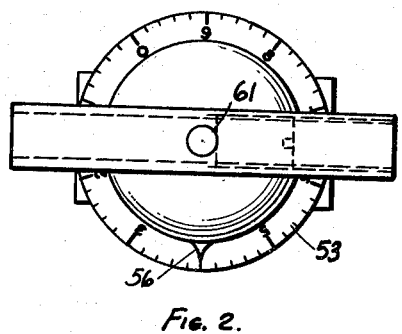
FIG. 2 is a top view of a valve.

Referring now more specifically to the drawing, a valve body 10 is shown which is made of one integral part. The body 10 is preferably made of a suitable metal or plastic, generally rectangular in cross section and longitudinal section. A lateral hole or passage 15 is drilled from one side through the center of the valve body 10 to terminate at an end 19. The hole 15 is counterbored at 11 and the counterbore 11 is threaded at 13 in a manner suitable for attachment to a conventional pipe line or the like. The edges from the entrance of the counterbore 11 to the passage 15 are broken at 16 to avoid turbulence in the flow of fluid through the valve.

Similar holes or passages 17 are drilled from the opposite edge of the valve and counterbored at 12. The counterbores 12 are threaded at 14 with threads suitable to connect the valve to a suitable pipe line or the like. The entrance to the passage 17 from the counterbore 12 is broken at 18 to reduce the turbulence of flow of fluid from the counterbore 12 to the passage 17.

A vertical hole or passage 20 is bored from the top of the valve to meet the passage 15 and is counterbored at 21 to form a sharp edged valve seat 22 and to connect the passage 15 with the passage 20 which is engaged by a valve stem 23. A needle point 24 on the stem 23 is preferably conical or of other suitable convex shape to maintain a line contact with the valve seat 22.

The bore 20 is provided with a counterbore 25 which is larger than the counterbore 21 and which provides shoulders 26 whereon a spacer member or sleeve 27 rests. The spacer member 27 is made of similar material to the material of the body 10 and is cylindrical in shape. The spacer 27 engages an outer edge 28 of the counterbore 25 and one end thereof rests on the peripheral shoulder 26. A clearance 29 is provided between the spacer 27 and the stem 23 so that the point 24 is disposed at an appreciable distance from its point of lateral restraint on a packing support 30 by engagement with the spacer 27. The spacer 27 may be shortened to provide space for additional packing where the application so requires.

The inner packing support 30 is disposed in the counterbore 25 and rests on one end of the spacer 27. The packing support 30 is preferably made of material similar to the material of the valve body 10 and forms a support for an O-shaped washer or ring 31. A close tolerance between the packing support 30 and the stem 23 and between the outer surface of the packing support 30 and the inner surface of the counterbore 25 is possible in order to prevent extrusion of the resilient material of the O-shaped washer 31. The outer edge of the O-shaped washer 31 engages the inner surface of the counterbore 25 and the inner surface of the O-shaped washer 31 engages the outer surface of the needle valve on the stem 23.

An outer packing support member 33 is provided with a flange 34 which rests on top of the washer 31. Sides 35 of the support 33 engage the inner surface of the counterbore 25. The outer packing support 33 is preferably made from a metal dissimilar to the metal of the body 10 of the valve in order to prevent galling or seizing between the valve body 10 and the packing support 33 with the close fit necessary to prevent extrusion of the packing. Similarly, a gland 40 is preferably made of dissimilar material from the metal of the valve body 10 and an enlarged portion 45 in order to allow a closer fit between the enlarged portion 45 and the gland threads to allow reduced clearance therebetween.

The O-shaped washer 31 may be made of synthetic material such as synthetic rubber or a plastic material or it may be made of any suitable metal. A clearance 36 is provided between the flange 34 and a shoulder 37 formed by an additional counterbore 38 so that the outer packing support 33 can be forced downward into engagement with the O-shaped washer 31 with the desired pressure. The additional counterbore 38 is threaded at 39 to receive the gland 40 which is threaded at 41 to engage the threads 39. The gland 40 engages the flange 34 at 42 to force it downwardly into engagement with the washer 31. The packing literally floats on its supports since the operator will tighten the gland 40 with his fingers and thus can "feel" when he has the desired pressure on the packing and by means of the gland 40. Thus, the pressure on the O-shaped washer 31 will in part determine the sealing qualities of the washer 31; that is, the sealing qualities of the washer 31 will be determined by the torque exerted on the gland 40 which will in turn be controlled by the operator's "feel."

The gland 40 has a bore 43 which extends over the upper part of a valve stem 44. The valve stem 44 has the enlarged portion 45 which is threaded at 46 to engage a complementary female threaded counterbore 52 inside the gland 40. A spring 47 engages a shoulder 48 inside the gland 40 at one end thereof and the other end thereof engages a surface 49 on the enlarged portion 45. Therefore, the spring 47 acts as a safety stop or resilient mechanical limit when the valve is opened. A lock nut 50 has internal threads 51 which engage the male threads 46 on the outside of the enlarged portion 45. When the gland 40 has been tightened down to give the proper compressive force on the O-shaped washer 31 the gland 40 can be locked in that positive position by means of tightening the lock nut 50.

An accurately calibrated dial 53 is mounted on top of the valve body 10. The dial 53 can be calibrated in any suitable manner. A cup shaped pointer carrier 54 has downwardly extending sides 55 which carry an indicating pointer 56 which has a bore 57 therethrough through which passes the stem 44. A threaded hole 58 is drilled from one side of the pointer carrier 54 and a set screw 59 threadably engages the hole 58 and engages the stem 44 to lock the pointer carrier 54 in the desired position.

A suitable handle 60 made of plastic or suitable material is mounted on the valve stem 44 by means of a hole 61 through which extends a reduced size end 63 of the valve stem 44. An upper end of the valve stem 44 can be fastened to the handle 60 by peening or by means of a set screw or any other suitable fastening means.

Figure 1:
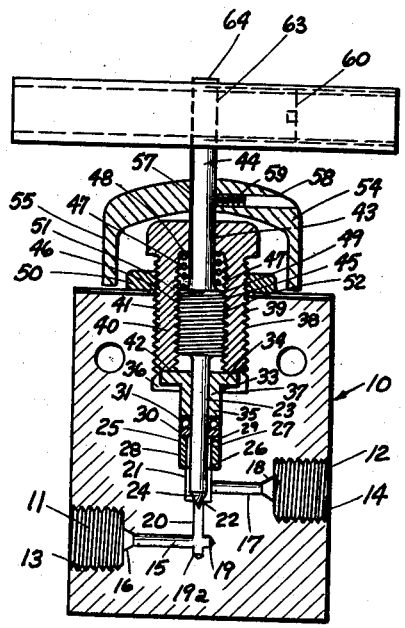
FIG. 1 is a cross sectional view of a valve.
Figure 3:
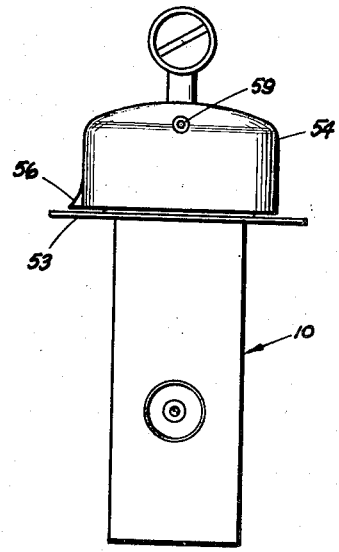
FIG. 3 is an end view of a valve.

During operation, the valve is assembled as shown in FIG. 1. The gland 40 is tightened down by the operator grasping it with the tips of his fingers and rotating it until the proper compressive engagement between the O-shaped washer 31 and the counterbore 25 and stem 23 is obtained. The manner in which the operator is enabled to grasp the gland 40 enables him to "feel" the amount of pressure he is exerting on the packing between the supports 30 and 33. The lock nut 50 is then tightened to lock the gland 40 in that position. The handle 60 is then rotated until the point 24 of the valve engages the valve seat 22. Because of the manner in which the handle 60 enables the operator's fingers to engage it, the operator can "feel" when the valve is closed. The valve seat 22 will, therefore, not be damaged and the packing will be subjected to a minimum pressure so that it will not be distorted and caused to take a permanent set. The set screw 59 is then loosened and the pointer rotated until it moves to the zero position. The set screw 59 is then tightened to lock the indicator carrier 54 in that position.

The dial 53 is preferably provided with an accurately calibrated scale which enables the operator to duplicate a setting of the stem or, in other words, note the setting of the pointer on the scale, close the valve, and reopen it until the pointer returns to the position at which it was originally set. This means that the valve will be open to the original setting at that point. The valve is connected into a pipe line where it is desired to control the flow of fluid. One side of the pipe line is connected to the threaded counterbore 11 and the other side to the threaded counterbore 12. The flow of fluid can be controlled through the line by controlling the handle 60. The handle 60 may be made of steel, plastic, or aluminum and is preferably finished in a bright color where several valves are used in the application for a plurality of fluids. The handles of various valves can be finished in contrasting colors to distinguish the valves from each other.

It will be apparent that an extremely simple and practical valve is provided which is suitable for use in high pressure and high vacuum lines. By drilling the holes 15 and 20 deeper than necessary, that is, by drilling the hole 15 past the center to the end 19 and the hole 20 past the hole 15 at 19a, the usual restriction of passage and manufacturing difficulties in a valve of this type where two holes forming a channel through the valve meet has been eliminated. Provided herein are a novel combination of sealing or packing means and pressure control thereby and a valve wherein settings can be duplicated and a very effective design of valve seat whereon pressure of the valve point can be controlled.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body member, spaced bores formed in said valve body, means to connect pipes to said spaced bores, a vertical hole formed in the valve body connecting said two spaced bores, said vertical hole having a first, a second, and a third counterbore, said first counterbore extending from a point where it communicates with one lateral opening to a point intermediate said openings, said second counterbore terminating at a shoulder adjacent said first counterbore, said third counterbore terminating in a peripheral shoulder, a valve stem in said vertical hole having a point, said point engaging said shoulder whereby the flow of fluid through said valve is controlled, an enlarged threaded portion on said stem, said third counterbore being internally threaded, means engaging said enlarged threaded portion whereby when said stem is rotated in one direction, said point is withdrawn from engagement with said shoulder to permit flow of fluid and when said stem is rotated in the other direction, said point is forced into engagement with said shoulder to stop the flow of fluid, said second counterbore being disposed between said first and said third counterbores, an O-shaped sealing washer on said stem and disposed in said second counterbore, means supporting said O-shaped sealing washer on a shoulder between said first and said second counterbores, means engaging said enlarged threaded portion comprising a gland having a bore concentric with said stem and a threaded counterbore concentric with said enlarged portion and being externally threaded to engage threads in said third counterbore, a supporting member in said second counterbore, said gland engaging said supporting member exerting a compressive force on said washer when said gland is rotated to move it toward said supporting member, locking means to lock said gland in a predetermined position locking said gland in engagement with said supporting member, and a spring inside said counterbore of said gland engaging said gland and said enlarged portion.

2. A valve comprising a body member, spaced lateral bores formed in said body member, means to connect pipes to said lateral bores, a vertical bore formed in said valve body to connect said two spaced bores, said vertical bore having a first, a second, and a third counterbore, said first counterbore extending from a point where it communicates with one lateral bore to a point intermediate said bores, said first counterbore terminating in a peripheral shoulder, a valve stem in said vertical bore having a convex point, said convex point engaging said shoulder whereby the flow of fluid through said valve is stopped, an enlarged threaded portion on said stem, an internally threaded member in said third counterbore engaging said enlarged threaded portion whereby when said stem is rotated in one direction, said convex point is withdrawn from engagement with said shoulder to permit flow of fluid and when said stem is rotated in the other direction, said convex point is forced into engagement with said shoulder to stop the flow of fluid therethrough, means to attach said internally threaded member to said body, said second counterbore terminating adjacent said third counterbore defining a shoulder, a packing member disposed on said stem above said point, an inner packing support and an outer packing support both fitted on said stem and slidable therewith and fitted into said second counterbore, said outer packing support being made of dissimilar material to the material of which said body is constructed, and a spacer member concentric with said stem having a substantial clearance therebetween and engaging said second counterbore and being disposed between said second counterbore shoulder and said inner packing support, said inner packing support being concentric with said stem and having a close fit between said stem.

3. The valve recited in claim 2 wherein an indicator member is disposed on said valve stem, said indicator member comprising a hollow tubular member having a transverse hole for receiving the upper end of said valve stem, one end of said tubular member being threaded to receive a set screw, said set screw being adapted to engage said valve stem to lock said indicator member against rotation thereon.

4. A valve comprising a body member, spaced lateral holes formed in said valve body, means to connect pipes to said lateral holes, a vertical hole formed in said valve body to connect said spaced holes, said vertical hole having a first, a second, and a third counterbore, said first counterbore extending from a point where it communicates with one lateral opening to a point intermediate said openings, said first counterbore terminating in a peripheral shoulder, a valve stem in said vertical hole having a point, said point engaging said shoulder whereby the flow of fluid through said valve is stopped, an enlarged threaded portion on said stem, an internally threaded member in said third counterbore engaging said enlarged threaded portion whereby when said stem is rotated in one direction, said point is withdrawn from engagement with said shoulder to permit flow of fluid and when said stem is rotated in the other direction, said point is forced into engagement with said shoulder to stop the flow of fluid, an O-shaped sealing washer between said stem and said second counterbore, said threaded member comprising a gland having a counterbore concentric with said stem and being externally threaded to engage threads in said third counterbore, a supporting member exerting a compressive force on said washer when said gland is rotated to move it toward said supporting member, locking means to lock said gland in a predetermined position, and a spring inside said counterbore of said gland engaging said gland and said enlarged portion.

5. A valve comprising a body member, spaced lateral bores formed in said valve body, means to connect pipes to said lateral bores, a vertical bore formed in said valve body to connect said spaced bores, said vertical bore having a first, a second, and a third counterbore, said first counterbore extending from a point where it communicates with one lateral bore to a point intermediate said bores, said first counterbore terminating in a peripheral shoulder, a valve stem in said vertical bore having a point, said point engaging said shoulder whereby the flow of fluid through said valve is stopped, an enlarged threaded portion on said stem, an internally threaded member in said third counterbore engaging said enlarged threaded portion whereby when said stem is rotated in one direction, said point is withdrawn from engagement with said shoulder to permit flow of fluid and when said stem is rotated in the other direction, said point is forced into engagement with said shoulder to stop the flow of fluid, an O-shaped sealing washer between said stem and the walls of said second counterbore, said threaded member comprising a gland having a bore concentric with said stem and being externally threaded to engage threads in said third counterbore, a supporting member exerting a compressive force on said washer when said gland is rotated to move it into engagement with said supporting member, locking means to lock said gland in a predetermined position, and a spring inside said counterbore of said gland engaging said gland and said enlarged portion.

References Cited in the file of this patent

UNITED STATES PATENTS

| | | |
|---|---|---|
| 191,500 | Weigand | May 29, 1877 |
| 214,841 | Prindle | Apr. 29, 1879 |
| 961,220 | Everson | June 14, 1910 |
| 1,179,711 | Fitts | Apr. 18, 1916 |
| 1,638,077 | Williams | Aug. 9, 1927 |
| 1,698,439 | Johnson | Jan. 8, 1929 |
| 1,779,740 | Kehl | Oct. 28, 1930 |
| 1,926,868 | Galloway | Sept. 12, 1933 |
| 2,223,986 | Eaton | Dec. 3, 1940 |
| 2,370,245 | Jacobson | Feb. 27, 1945 |
| 2,391,278 | Stark | Dec. 18, 1945 |
| 2,661,182 | Kipp | Dec. 1, 1953 |
| 2,690,360 | Young | Sept. 28, 1954 |
| 2,703,719 | Crothers | Mar. 8, 1955 |
| 2,805,040 | Voss | Sept. 3, 1957 |

FOREIGN PATENTS

| | | |
|---|---|---|
| 172,795 | Austria | Oct. 10, 1952 |